April 24, 1962 — N. J. RADZIWON — 3,030,858
SPECTACLE MOUNTING
Filed Dec. 16, 1959

INVENTOR.
NORMAN J. RADZIWON
BY Frank C. Parker
ATTORNEY

3,030,858
SPECTACLE MOUNTING

Norman J. Radziwon, Irondequoit, N.Y., assignor to Bausch & Lomb Incorporated, a corporation of New York
Filed Dec. 16, 1959, Ser. No. 859,982
3 Claims. (Cl. 88—41)

This invention relates to spectacle frames and more particularly to spectacle frames of the combined metal and plastic type.

A recent trend in spectacle frame design has been to provide such frames comprising integral metal eyewires and a nasal arch, with decorative plastic frame members mounted on top of the eyewires and extending thereacross to the temporal region of the frame.

The primary object of the present invention is to provide an improved means for fastening the decorative plastic frame members on top of the metal eyewires, which fastening means is easy to operate and securely retains the plastic members in assembly with the eyewires.

The foregoing and other objects of the present invention as well as numerous advantages thereof will become more apparent from the following detailed description, wherein.

Figure 1:
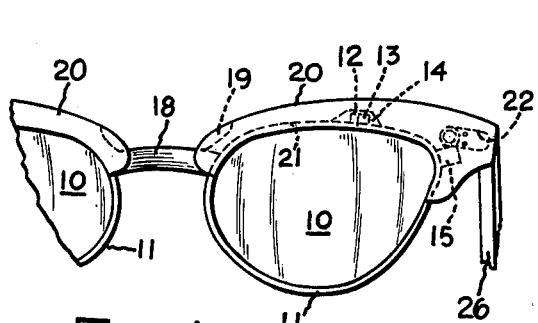
FIG. 1 is a fragmentary front elevational view of a spectacle frame incorporating the features of the present innvention.

With reference now to the drawings, wherein like reference numerals have been used in the different views to identify identical parts, the spectacle comprising the subject matter of the present invention comprises a pair of spaced lenses 10 respectively mounted within a pair of encircling eyewires 11. The eyewires 11 are each formed with a pair of end lugs 12 and 13 which are secured together by means of a small screw 14. A second lug 15 is also formed integrally with each eyewire 11 at the temporal region thereof and is formed with an enlarged generally cylindrically shaped end 16 secured to the lug 15 by a reduced neck portion 17.

The two eyewires 11 are respectively integrally connected by means of a metal nasal arch 18, there being hook members 19 formed at the opposed ends of the nasal arch 18, which hook members 19 extend along and above each of the eyewires 11 respectively.

Figure 2:
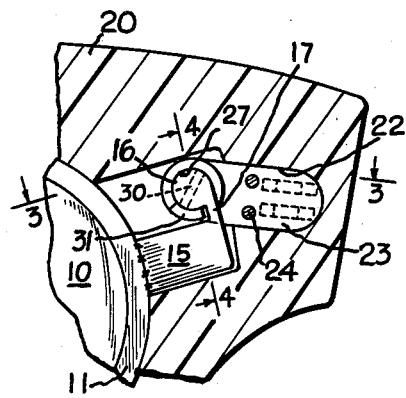
FIG. 2 is a fragmentary sectional view showing the structural details of the locking device comprising the subject matter of the present invention.
Figure 3:
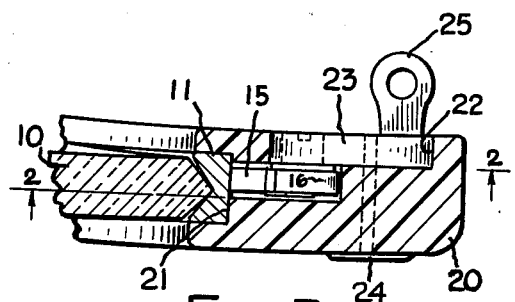
FIG. 3 is a fragmentary sectional view taken substantially along the line 3—3 in FIG. 2 and looking in the direction of the arrows.
Figure 5:
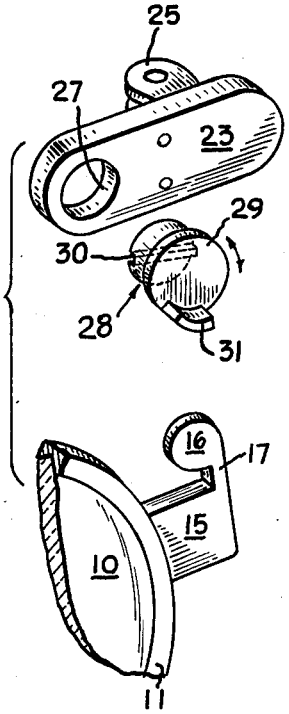
FIG. 5 is an exploded perspective view illustrating the locking mechanism comprising the subject matter of the present invention.
Figure 4:
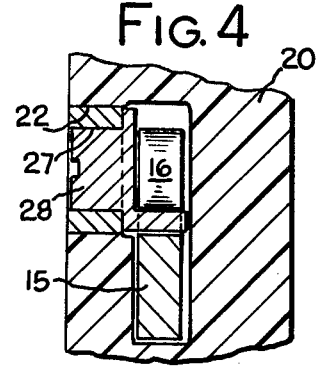
FIG. 4 is a fragmentary sectional view taken substantially along the line 4—4 in FIG. 2 and looking in the direction of the arrows.

A plastic essentially decorative frame member 20 is formed with cut outs for receiving the hook member 19, lugs 12 and 13, lug 15 and end projections 17. The decorative plastic rim member 20 is channeled around its inner periphery, as indicated at 21, for securing the eyewire 11 therein. Each plastic frame member 20 is also cut out, as indicated at 22, for the purpose of receiving a metal insert 23 which is secured within the cut out 22 by means of suitable rivets 24. The metal member 23 is provided with suitable hinge elements 25 for the purpose of hingedly mounting a temple 26 on either side of the frame. Each of the metal members 23 is formed with a cylindrical opening 27 which serves as a bushing for a round locking member 28. The locking member 28 is formed with a flange portion 29 which abuts the face of metal insert 23 and a transverse slot 30 is provided for rotating the locking member 28 within the opening 27. A short cylindrically shaped locking projection 31 which projects from the face of plate portion 29 is rotatable to a position which permits the insertion of lug 15 and end 16 into the cut out in the plastic frame member 20. Thereafter, the locking member 28 may be rotated in a counterclockwise direction, as viewed in FIG. 2, in order to bring the cylindrical projection 31 into locking engagement with the end 16. When the opposite end of the frame member 20 is locked under the hook 19, and the projection 31 is disposed in the position shown in FIG. 2 in abutment with neck portion 17, the decorative plastic frame member 20 is securely held in place on the eyewire 11 and with respect to the nasal arch 18.

In order to accommodate slight misalignment of parts, it is contemplated that the neck portion 17 which secures the end 16 with lug 15, may be bent slightly without impairing the operation of the device.

It is contemplated that numerous changes and modifications may be made in the present invention without departing from the spirit or scope thereof.

What is claimed is:

1. A fastening device for attaching the temporal portion of a browpiece to a spectacle frame over which it extends, said device comprising an attachment lug which is fixed to the temporal portion of said frame and extends outwardly therefrom, the free end of said lug having an upstanding abutment element formed thereon which is connected to the other end of the lug by a reduced neck element, an anchor plate secured in said browpiece adjacent and parallel to one side of said lug, a locking member having a cylindrical hub which is rotatably mounted in said plate, said member having a locking element protruding therefrom into contact with said abutment element when the member is rotated to locked position, and means for rotating said locking member.

2. A fastening device as set forth in claim 1 further characterized by the upstanding element of said lug being constructed with a circular peripheral edge surface, and said locking member being substantially concentric with said edge surface and having an arcuate locking element protruding therefrom across and in contact with said surface whereby said locking element serves as a stop member when rotated to unlocked position during assembly of the browpiece and serves as a locking element when rotated to locked position.

3. A fastening device as set forth in claim 2 further characterized by said reduced neck element and said upstanding element being integral with said lug and extending at one side normal to the main body of the lug whereby the neck may be slightly bent to position said upstanding element toward or away from said frame to adjust the center of its circular portion into concentricity with said cylindrical hub before assembly.

References Cited in the file of this patent
UNITED STATES PATENTS

| | | |
|---|---|---|
| 2,495,508 | Cleaver | Jan. 24, 1950 |
| 2,786,391 | Lutes | Mar. 26, 1957 |

FOREIGN PATENTS

| | | |
|---|---|---|
| 777,004 | Great Britain | June 12, 1957 |